Feb. 6, 1968    B. L. WOODS ET AL    3,367,083
CIRCULAR BUILDING STRUCTURE

Filed July 8, 1966    5 Sheets-Sheet 1

INVENTORS.
BILLY L. WOODS -AND-
RICHARD L. COOK
BY
Willard S. Gwen
ATTORNEY

INVENTORS.
BILLY L. WOODS - AND -
RICHARD L. COOK
BY
Willard S. Growe
ATTORNEY

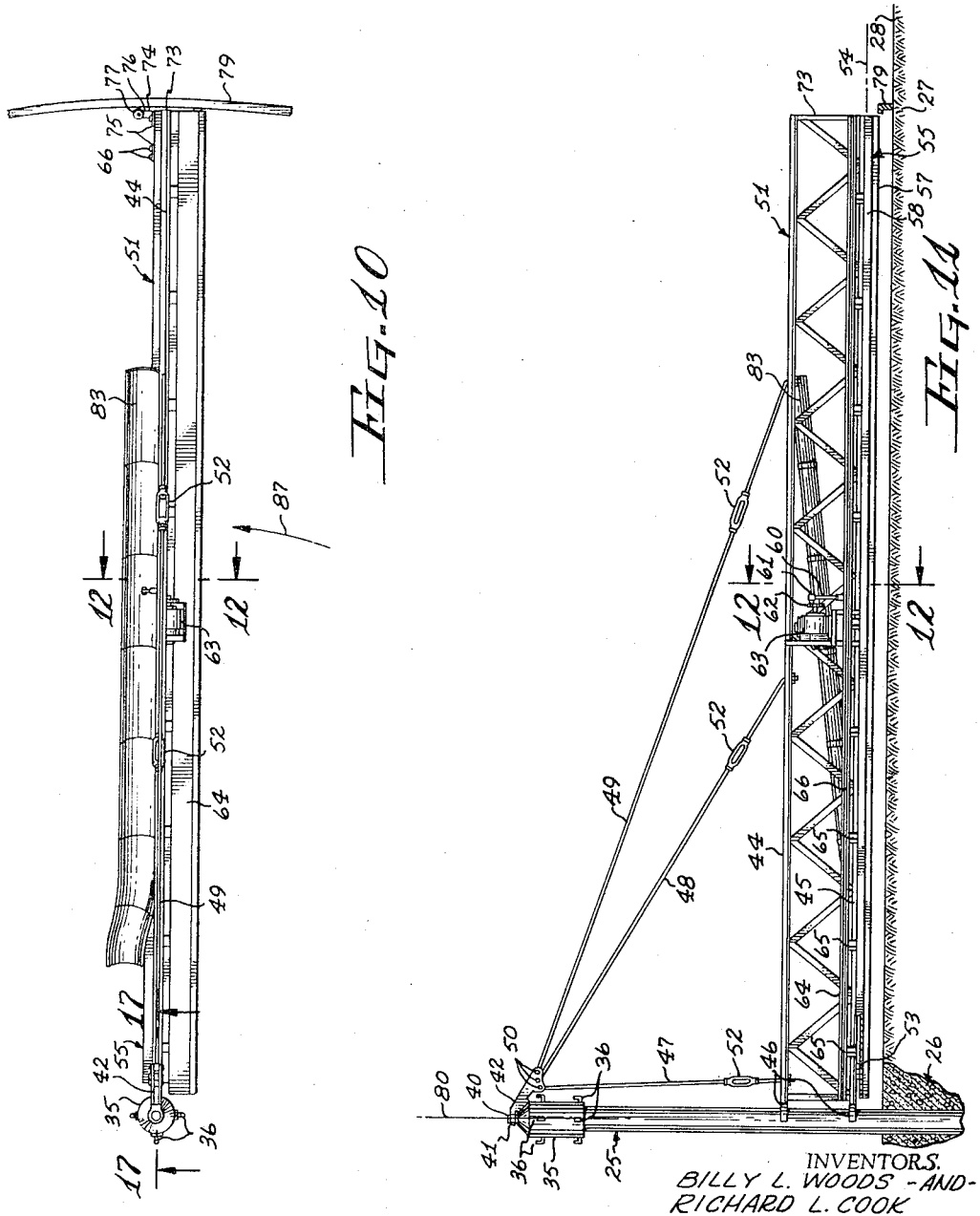

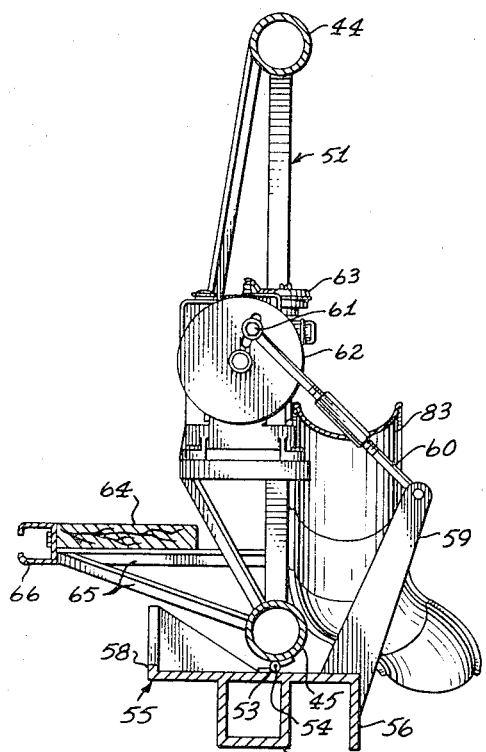
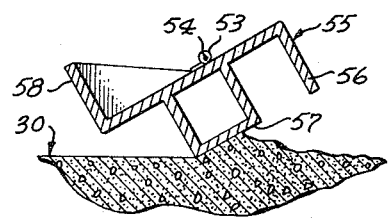
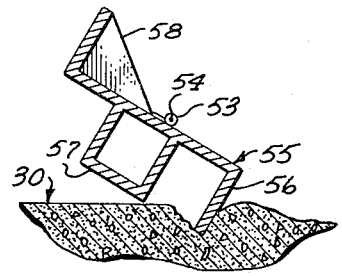
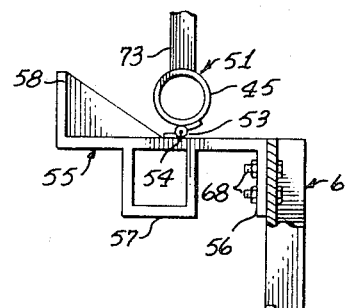
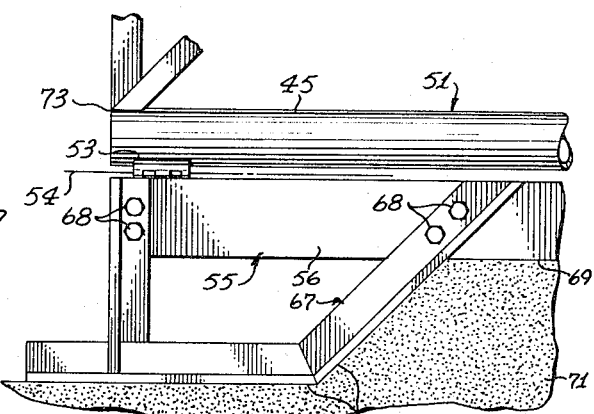
INVENTORS
BILLY L. WOODS -AND-
RICHARD L. COOK Feb. 6, 1968  B. L. WOODS ET AL  3,367,083
CIRCULAR BUILDING STRUCTURE
Filed July 8, 1966  5 Sheets-Sheet 3

INVENTORS.
BILLY L. WOODS AND
RICHARD L. COOK
BY
Willard S. Grow
ATTORNEY

United States Patent Office 3,367,083
Patented Feb. 6, 1968

3,367,083
CIRCULAR BUILDING STRUCTURE
Billy L. Woods, 3818 W. Ocotillo 85019, and Richard L. Cook, 4841 W. Elm Drive 85031, both of Phoenix, Ariz.
Filed July 8, 1966, Ser. No. 563,836
5 Claims. (Cl. 52—741)

The invention pertains to circular building structures and is particularly directed to a method and apparatus for constructing such circular buildings.

One of the objects of this invention is to provide a method and apparatus for constructing a circular building in which the roof structure is supported solely on the annular outside wall of the building structure.

Still another object of this invention is to provide a means for constructing a circular building having no interferring post structures within the annular wall of the building and which may be constructed with a minimum of effort, skill and labor being required to complete the finished building.

Still another object of this invention is to provide a circular building in which the floor form for the outer edge of the periphery of the circular concrete floor after serving as the form for the concrete is further raised to the desired height of the building and utilized as part of the roof structure and wall plate of the building.

Still another object of this invention is to provide a building utilizing a very minimum amount of materials for the floor space structure completely free of posts and support devices or trusses other than the top annular plate of the wall of the building.

Still another object of this invention is to provide apparatus for constructing a circular building of special character for spirally pouring and finishing and compacting the concrete floor of the building in an automatic machine made manner.

It is a further object of this invention to provide a circular building in which a plastic stressed roofing cover is supported solely on the upper edge of the outside annular wall of the building in a manner to provide proper drainage and control of the roof canopy.

It is a further object of this invention to provide a method and apparatus for constructing a circular building by utilizing a central post for performing the various operations of laying the floor and in raising and constructing the roof of the building.

Further features and advantages of this invention will appear in a detailed description of the drawings in which:

FIG. 10 is a plan view of the concrete and fill laying and finishing machine utilized in connection with the construction of the floor of the circular building.

FIG. 11 is a side elevation of the concrete fill laying and finishing machine shown in FIG. 10.

FIG. 12 is an enlarged sectional view of the concrete and fill laying and finishing machine shown by the line 12—12 of FIGS. 10 and 11.

FIG. 13 is a fragmentary sectional view similar to FIG. 12 but showing the blade of the troweling and tamping mechanism in trowel stroke position.

FIG. 14 is a view similar to FIG. 13 but showing the tamping and troweling mechanism in tamping stroke position.

FIG. 15 is a fragmentary side elevation of the grade forming and screeding device for the apparatus of FIGS. 10 and 11.

FIG. 16 is an end elevation of the apparatus shown in FIG. 15.

Figure 1:
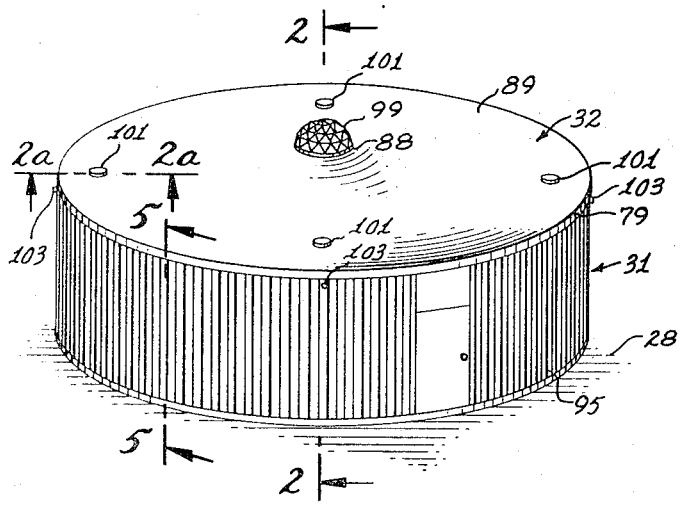
FIG. 1 is a general perspective view of a circular building incorporating the features of this invention.

As an example of one embodiment of this invention, there is shown a circular building structure comprising a vertically disposed centrally located construction post 25 which is securely mounted in a suitable pole footing 26 secured in the ground 27 and having a top surface 28 at ground level 33 of the bottom surface 34 of the floor slab 30 of the building. Around the outer perimeter of the floor slab is arranged the annular wall 31 on top of which is mounted the suspended plastic roof 32.

Constructing floor slab

Figures 17, 18:
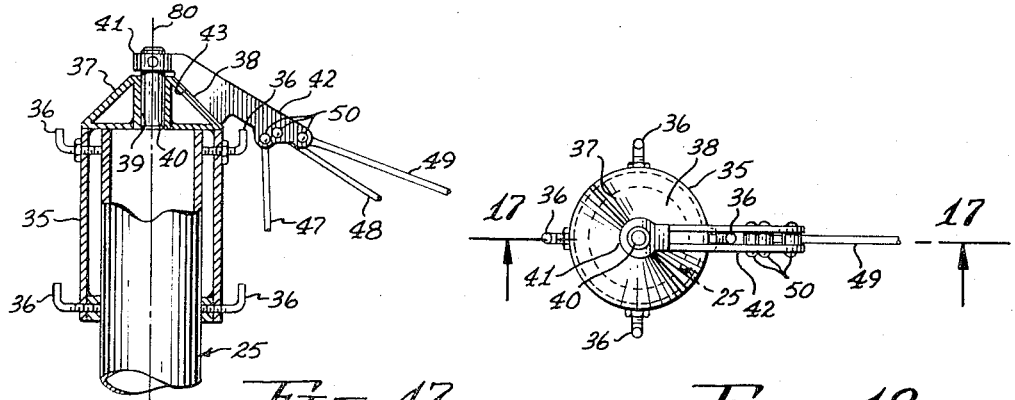
FIG. 17 is an enlarged sectional view on the upper end of the main support post indicated by the line 17—17 of FIGS. 10 and 18.
FIG. 18 is an enlarged fragmentary top plan view of the post structure shown in FIG. 17.
Figure 19:
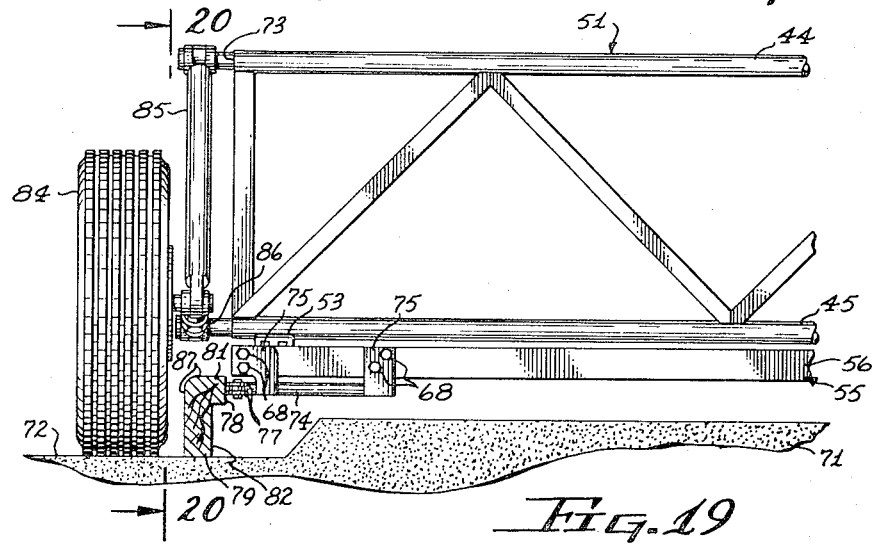
FIG. 19 is an enlarged fragmentary view of the outer end of the concrete and fill laying and finishing machine with an outboard roller support.
Figure 20:
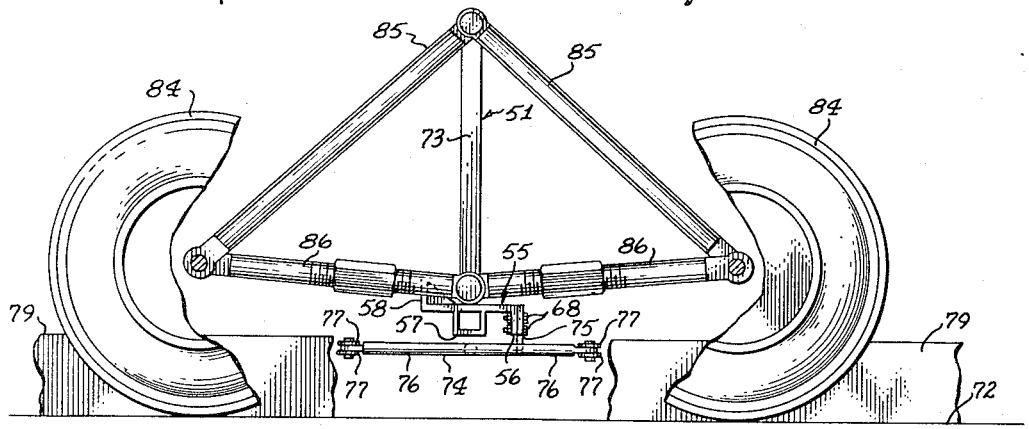
FIG. 20 is an enlarged sectional view on the line 20—20 of FIG. 19.

After the construction post 25 has been set in the footing 26, a fill preparing and concrete laying machine of unique construction is operatively mounted on the post 25. To this end, FIGS. 17 and 18, there is provided a cylindrical mounting sleeve 35 appropriately demountably secured to the top of the post 25 by suitable clamp bolts 36 and having a conically shaped top integral casting 37 including a conical bearing surface 38 and a vertically disposed bearing bore 39 which receives and journals a shaft 40 having its upper end fixed to the inner end 41 of the swinging arm 42 which also has a bearing shoe 43 slidingly engaging the conical bearing surface 38. A boom 51 comprising the upper and lower radially disposed truss members 44 and 45 has U-shaped bearings 46 on the rear or inner ends of these truss members which engage the lower peripheral cylindrical portion of the construction post 25. Suspension rods 47, 48 and 49 are connected by suitable pins 50 to the swinging arm 42 at their upper ends while the lower ends of these rods are attached to the boom 51 through suitable height adjusting turnbuckles 52.

Pivotally mounted on suitable hinges 53 fixed to the lower portion of the truss member 45 so as to rock about a radially disposed horizontal axis 54 is the tamping and troweling bar 55 having a tamping blade 56 and a troweling blade 57 and a counterbalance portion 58. Intermediate the ends of the tamping and troweling bar 55 is fixed an actuating arm 59 connected by a suitable lenght adjustable connecting rod 60 pivotally attached to a radially adjustable crankpin 61 of the eccentric disc 62 carried on the output shaft of a suitable source of power mounted on the boom 51 such as a gasoline engine 63. A catwalk 64 is supported on suitable brackets 65 fixed to the boom 51 which brackets also include a suitable T-slot mounting rail 66.

An edger and screeding blade 67 is suitably demountably secured to the tamping blade 56, FIGS. 15 and 16, by bolts 68 and comprises the main scraper blade 69 and the step former 70 which levels and forms the base fill material 71 to desired shape to receive the concrete floor slab 30. After the fill material has been dumped on the ground surface 72, the engine 63 started with the associated mechanism adjusted for maximum tamping stroke. A truck or tractor is suitably hitched to the outer end of the boom 51 which pulls it around the post to complete the leveling of the base fill.

The edger 67 is then removed and the ring assembly jig 74 attached to the boom 51 by suitable mounting brackets 75 fixed to arms 76 and having contact rollers 77 on their outer ends which engage the inside bore surface 78 of the form ring 79 positioned on the accurately screeded ground surface 72 so that the form ring may be accurately radially located relative to the vertical axis 80 of the construction post 25. The concrete form ring 79 is assembled as a series of suitably connected segments on the previously accurately graded ground surface 72 with the recessed portion 81 and flange portion 82 facing inwardly. The form ring 79 is then staked in postiion by any suitable means to secure it during the concrete pouring operations.

The ring assembly jig 74 is then removed from the boom and the tamping blade 56 and troweling blade 57 adjusted to correct height, pitch and stroke for pouring the concrete. A concrete transfer chute 83 is demountably attached to the boom 51 and outrigger steady rest support wheels 84 are demountably mounted on adjustable arms 85 and 86 on the outer end of the boom 51.

*Pouring concrete floor*

In pouring the circular concrete floor, the concrete supply truck is located in a position just outside the form ring 79 for driving in a direction tangent to the ring around the periphery thereof. The outer end 73 of the boom 51 is suitably hitched to the truck for towing in a counterclockwise direction of rotation, FIG. 10. The concrete truck pouring chute is set to discharge into the transfer chute 83 on the boom 51 from which the concrete is initially discharged in the area adjacent the construction post 25.

The concrete truck is advanced in the direction 87 as required to pour the concrete in a spiral pattern from the center outwardly of the floor slab 30. As the outwardly spiralling pouring progresses, segments of the transfer chute 83 are progressively removed to accomplish the spiral pour. When the spiral of pouring progresses to the point where the transfer chute is no longer needed, the concrete truck chute is used directly to complete the pour in the peripheral area of the floor slab up to and against the form ring 79.

When the pour is completed the steady rest support wheels 84 and associated arms are removed and the tamping and troweling of 56-57 is continued but preferably at a reduced stroke. When the concrete has been worked to the point where no further machine action is needed, the tamping-troweling unit is elevated so that it will clear the poured slab. A conventional rotary finisher is then attached to the T-slot mounting rail 66 for radial sliding movement thereon while being towed over the slab by the boom 51 under manual manipulation by an operator on the catwalk 64 to complete a fine finish on the concrete slab. The boom 51 is then removed from the post 25 and from the slab ready for the next job.

*Roof construction*

In constructing the roof for the cylindrical building, a release film such as Mylar is first placed on the top surface 29 of the finished poured floor slab 30 having the form ring 79 still in place. Next is to lay a layer of woven glass roving on the release film above, overlapping the joints two inches to assure satisfactory joint strength. Then wet the woven roving with polyester resin or equivalent thermosetting resin. Pigment may be added to reduce or eliminate light transmission through the laminate. The roving is wetted where it laps over the outside surfaces 87 form ring 79 to securely bond the roving to the ring 79. In a similar manner the inner ring 88 surrounding the construction post 25 is bonded to the laminate 89, FIG. 3. In structures where the roof is pitched upward, FIGS. 2 and 4, to the center construction post 25, additional plies of woven roving may be added as required to accommodate increased stresses incurred by snow loads and the like.

With the woven roving laminate 89 secured to the form ring 79 and the inner ring 88, suitable lifting jacks 90 are placed around the periphery of the form ring 79 at appropriate circumferentially spaced intervals around the ring, the jacks being operated to raise the ring 79 and attached roof laminate 89 to the required height. Thus, the form 79 performs the double service of forming the peripheral floor slab surfaces 91, 92 and 93 and when raised, the outer rim of plate for the roof of the building. The surfaces 92 and 93 of the floor slab 30 are thus automatically accurately aligned with the mating surfaces 82 and 94 of the ring 79 and provide the mounting surfaces for prefabricated wall panels 95. The panels 95 are placed into position and joined with standing vertical seams 96 to rigidly tie the panels together. Each panel is nailed into the surface 93 of the floor slab by suitable fastening means 97 while the upper ends of the panels 95 are secured by suitable fasteners 98 to the surface 82 of the ring support, down thrust being carried between the surface 94 of the ring 79 and the surface 92 of the floor slab and the surface 94 of the ring 79 abuttingly engaged by the ends of the panels 95. Suitable door frames and windows may be mounted in the panels 95 or on the surfaces 92–93 and 82–94 as required.

Figure 2:
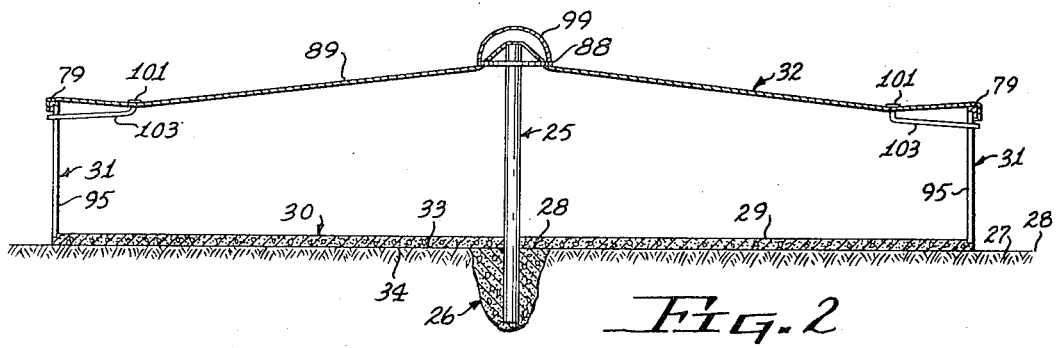
FIG. 2 is an enlarged sectional view on the line 2—2 of FIG. 1 showing one form of use structure of the building.
Figure 3:
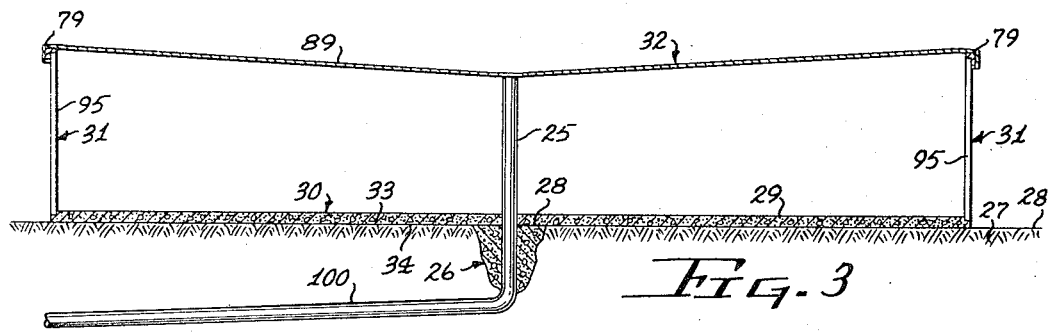
FIG. 3 is a sectional view similar to FIG. 2 but showing another modification of the structure shown in FIG. 2 of the structure.
Figure 2A:
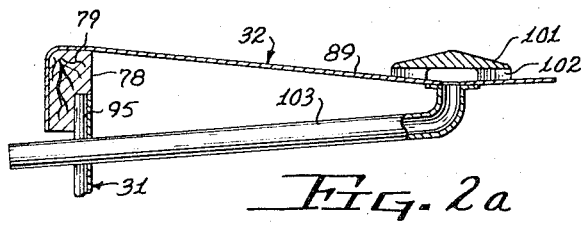
FIG. 2a is an enlarged fragmentary section on the line 2a—2a of FIG. 1.
Figure 4:
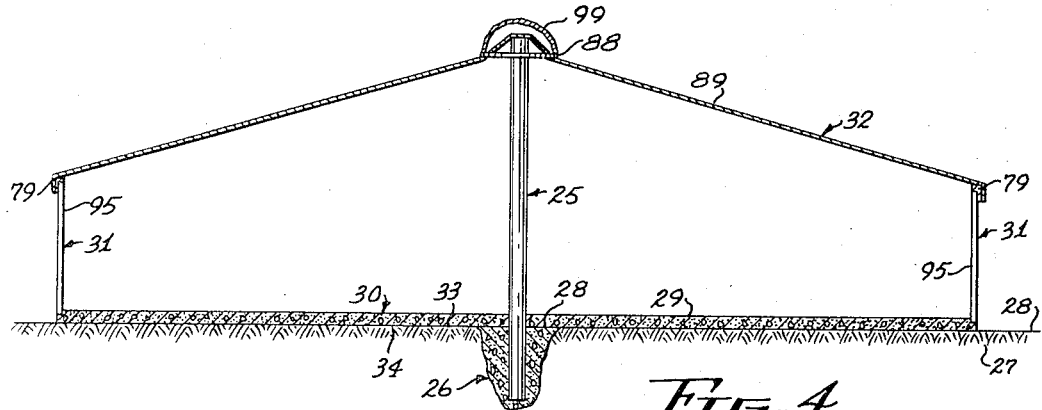
FIG. 4 is still another modification showing a view similar to FIGS. 2 and 3 for the roof structure of the building.
Figure 5:
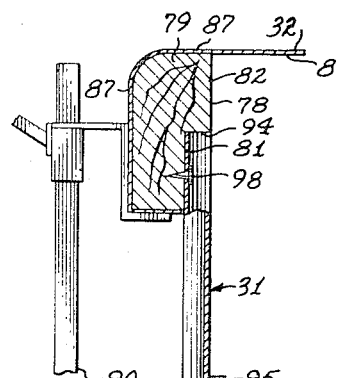
FIG. 5 is an enlarged fragmentary sectional view on the line 5—5 of FIG. 1 showing the annular wall cross section.
Figure 6:
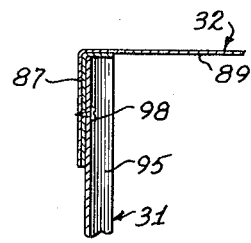
FIG. 6 is a sectional view similar to FIG. 5 but showing a modification of the roof fastening plate of the annular wall of the building.
Figure 7:
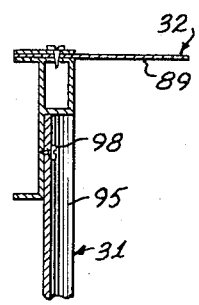
FIG. 7 is a view similar to FIGS. 5 and 6 but showing still another modification of a metal floor forming device and roof supporting structure.
Figure 8:
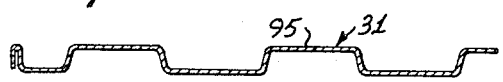
FIG. 8 is an enlarged sectional view on the line 8—8 of FIG. 5 showing a cross section to the vertical wall panels.
Figure 9:
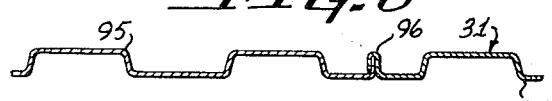
FIG. 9 is a view similar to FIG. 8 but showing the arrangement of over-lapping panels.

In cases where the roof pitches up toward the center post, FIGS. 2 and 4, by suitably securing the center ring 88 in elevated position on the post 25, a cupola 99 may be used to keep out precipitation and to function as a ventilator. In cases where the roof laminate 89 drapes naturally toward a center drain, FIG. 3, a connection is made to the drain pipe 100, taking the place of or utilizing the construction post 25. Where the flat laying and raised center roof system of FIG. 2 is utilized, a drain system is installed at points 101 set in from the ring 79 and at circumferentially spaced positions about the roof laminate 89. Suitable weighted catch basins 102 are connnected to suitable drain pipes 103 projecting out through the walls 95 are utilized.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. The method of constructing a circular building comprising the steps of:
   (A) securing a vertically disposed central located construction post in the ground,
   (B) pivotally mounting a radially disposed boom for swinging about the vertical axis of said post, (C) dumping a slab supporting fill on the ground surface surrounding said post, (D) leveling said fill to desired configuration by swinging said boom around said post, (E) positioning and securing a form ring on the ground surface in accurate concentric position relative to said post, (F) pouring premixed concrete on said fill in an increasing spiral manner starting at the center adjacent said post and working progressively outwardly to said form ring, (G) and tamping and troweling said poured concrete by swinging said boom around said post thereby forming a floor slab.

2. The method of constructing a circular building as set forth in claim 1 wherein a roof is constructed for said building by:

(H) forming a plastic laminate over the poured floor slab surface and securing the edge thereof to said form ring, (I) raising said form ring to desired roof height, (J) and securing an annular wall between the periphery of said floor slab and said form ring to complete the building structure.

3. In a method of constructing a circular building as set forth in claim 1 wherein step E includes forming a recessed annular slot around the upper peripheral portion of said floor slab.

4. In a method of constructing a circular building as set forth in claim 2 wherein the forming of said plastic laminate formed on said floor slab in step H includes the attachment of the central portion of said laminate to a ring surrounding said post.

5. In a method of constructing a circular building as set forth in claim 1 wherein the form ring is raised to desired roof height to provide aligned mating surfaces in said floor slab perimeter and said form ring to receive the application of an annular wall therebetween.

References Cited
UNITED STATES PATENTS

| | | | |
|---|---|---|---|
| 1,103,863 | 7/1914 | Bowker | 264—34 |
| 2,435,052 | 1/1948 | Parret | 264—32 |
| 2,440,920 | 5/1948 | Stepanian | 25—1 |
| 2,805,631 | 9/1957 | Wiggins | 52—16 |
| 2,979,798 | 4/1961 | Price | 25—131 |
| 3,092,216 | 6/1963 | Tye | 52—745 |
| 3,315,343 | 4/1967 | Berg | 29—429 |

FRANCIS K. ZUGEL, *Primary Examiner.*